No. 742,503.

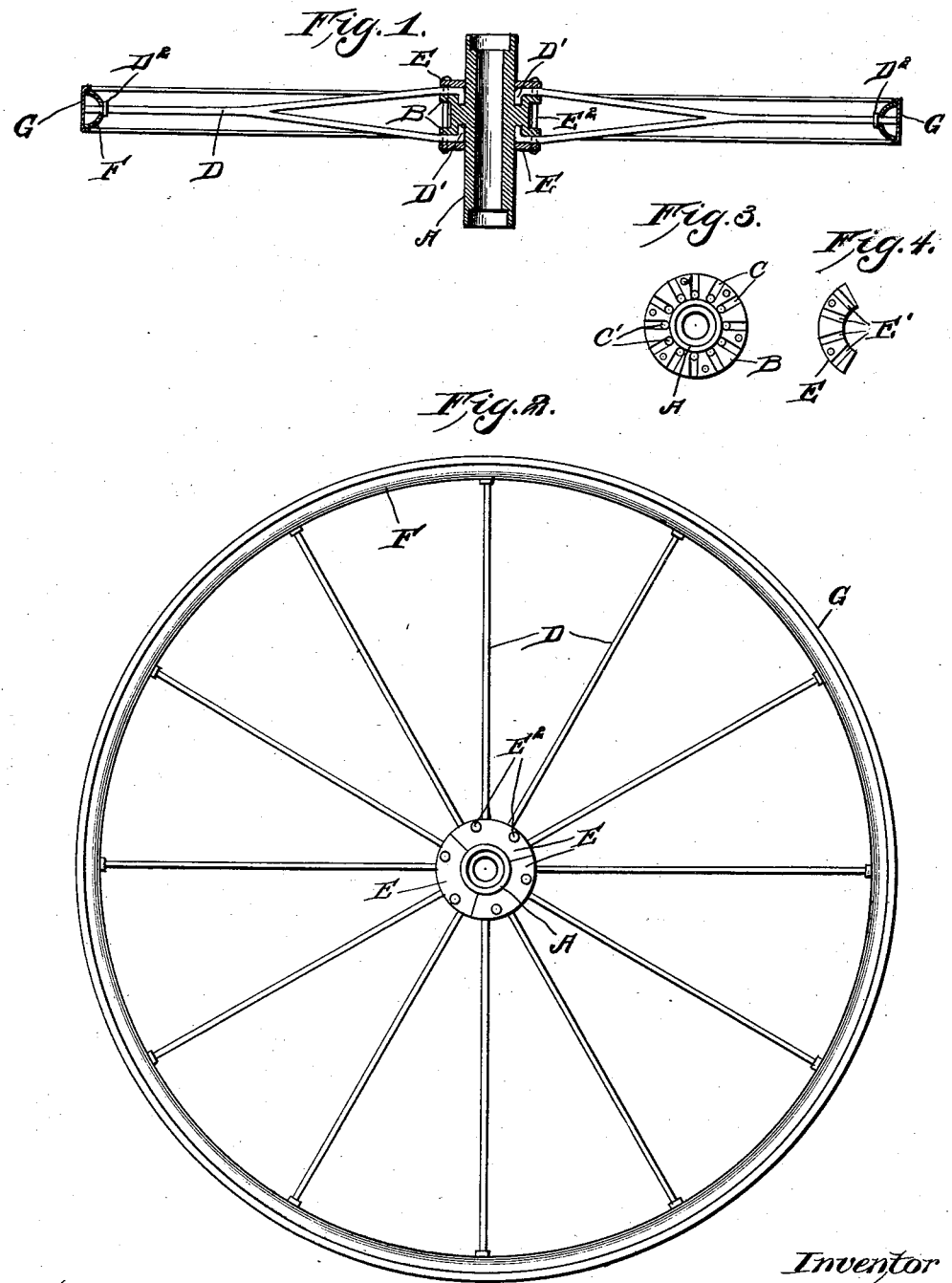

Patented October 27, 1903.

UNITED STATES PATENT OFFICE.

LOUIS B. SEEDS, OF INDIANA HARBOR, INDIANA.

WHEEL.

SPECIFICATION forming part of Letters Patent No. 742,503, dated October 27, 1903.

Application filed April 8, 1903. Serial No. 151,622. (No model.)

*To all whom it may concern:*

Be it known that I, LOUIS B. SEEDS, a citizen of the United States, residing at Indiana Harbor, county of Lake, and State of Indiana, have invented a certain new and useful Improvement in Wheels, of which the following is a specification.

My invention relates to a new and useful improvement in wheels, and has for its object to provide and construct a metal wheel which will have all the spring of a wooden wheel and yet possess much greater strength, be easily assembled, and much more easily repaired.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 represents a cross-sectional view through a wheel constructed according to my invention; Fig. 2, a face view of the wheel; Fig. 3, an end view of the hub with the sectional rings removed; Fig. 4, an inside face view of one section of one of the sectional rings.

A represents the hub of the wheel, which has formed with it near its central portion the annular flange or rim B. This annular flange or rim has formed upon each side of the same half-round radial grooves C, as shown in Fig. 3, and at the inner end of each of these grooves next to the barrel of the hub a hole C' extends from the groove inward.

D represents the spokes, which are single at their outer ends, but bifurcated at their inner ends, the forked portion commencing about half the length of the spoke. The prongs formed by the bifurcated ends are bent inward upon their inner ends, as shown at D'. In securing the spokes to the hub the prongs are sprung apart, so as to straddle the flange or rim B, and the inturned ends D' will spring into the holes C' and the prongs will lie in the grooves C about half the diameter of the prongs.

E represents sectional rings or collars, and each of the sections of each of the rings is provided upon its inner face with semicircular grooves E', as shown in Fig. 4, corresponding to the grooves C' in the flange. These sectional rings are placed against the flange B, so that the balance of the prongs will lie in the grooves E', and the sections of the rings E are secured in place by bolts or rivets E², which pass entirely through the flange B and through the ring E upon each side. Thus the spokes are held securely in place against radial and lateral displacement.

The outer ends of the spokes are provided with collars or enlargements D², and the ends of the spokes beyond these collars pass through a semicircular felly F. The tire G is secured to the felly in any suitable manner upon the outside.

The advantage of my invention is that I am enabled to make an exceedingly strong and serviceable wheel at a comparatively small cost, and the wheel may be easily and quickly assembled or repaired at any time, and by this construction I am enabled to make a dished wheel which will be as strong and durable as a straight wheel, because of the fact that the bifurcated spokes form a truss which supports the rim of the wheel from two different points in the well-known manner of truss-supports.

Of course I do not wish to be limited to the exact construction here shown, as slight modifications could be made without departing from the spirit of my invention.

Having thus fully described my invention, what I claim as new and useful is—

1. In a wheel, a hub, an annular flange formed with the barrel of the hub near its central portion, radial grooves formed in each face of the flange outside of the barrel of the hub, the flange being provided with holes extending into the same from the inner ends of each of the grooves, spokes bifurcated at their inner ends, the inner end of each of the prongs being turned inward, the bifurcated ends of the spokes adapted to straddle the flange, the inturned ends of the prongs springing into the holes, the prongs lying partially within the grooves of the flange, sectional rings provided with corresponding grooves upon their inner faces secured to the flange upon each side, and a felly and tire formed around the outer end of the spokes, as specified.

2. In a wheel, a hub, an annular flange formed with the hub, radial grooves formed in each face of the flange, the flange being provided with holes extending inward upon each side from the inner ends of the grooves, spokes bifurcated at their inner ends, the inner ends of the prongs being turned inward, the bifurcated ends of the spokes adapted to straddle the flange and lie partially within the grooves, the inturned ends lying within the holes, sectional rings provided with radial grooves upon their inner faces adapted to be secured to the flange upon each side, the prongs of the spoke lying partially within the grooves of the rings, collars or enlargements formed near the outer ends of each of the spokes, a felly, semicircular in cross-section through which the ends of the spokes outside of the collars or enlargements protrude, and a tire secured around the periphery of the felly, as and for the purpose specified.

3. In a wheel of the character described, a hub, an annular flange formed with the barrel of the hub near the central portion, radial semicircular grooves formed in each face of the flange, said flange being provided with holes extending inward upon each side from the inner ends of the grooves, spokes bifurcated on their inner ends, the spoke beginning to fork about half of its length, the inner ends of the prong being bent inward, the bifurcated ends of the spokes adapted to straddle the flange and lie partially within the radial grooves thereof, the ends of the prongs lying within the holes, sectional rings provided with radial grooves upon their inner faces arranged upon the outside of each side of the flange surrounding the barrel of the hub, the prongs lying partially within the grooves of the rings, rivets or bolts extending entirely through the rings and through the flange from one side to the other, and a felly and tire to which the outer ends of the spokes are secured, as and for the purpose specified.

In testimony whereof I have hereunto affixed my signature in the presence of two subscribing witnesses.

LOUIS B. SEEDS.

Witnesses:
SANFORD L. WEDDLE,
CHARLES E. FOWLER.